(12) United States Patent
Clark et al.

(10) Patent No.: US 10,450,883 B2
(45) Date of Patent: Oct. 22, 2019

(54) W-SEAL SHIELD FOR INTERRUPTED CAVITY

(71) Applicant: United Technologies Corporation, Farmington, CT (US)

(72) Inventors: Thomas E. Clark, Sanford, ME (US); Jeremy Drake, South Berwick, ME (US)

(73) Assignee: United Technologies Corporation, Farmington, CT (US)

( * ) Notice: Subject to any disclaimer, the term of this patent is extended or adjusted under 35 U.S.C. 154(b) by 390 days.

(21) Appl. No.: 15/339,151

(22) Filed: Oct. 31, 2016

(65) Prior Publication Data

US 2018/0119558 A1    May 3, 2018

(51) Int. Cl.
| | |
|---|---|
| *F01D 11/00* | (2006.01) |
| *F01D 25/24* | (2006.01) |
| *F02C 7/28* | (2006.01) |
| *F16J 15/08* | (2006.01) |

(52) U.S. Cl.
CPC ............ *F01D 11/005* (2013.01); *F01D 11/00* (2013.01); *F01D 11/003* (2013.01); *F01D 25/24* (2013.01); *F02C 7/28* (2013.01); *F16J 15/0887* (2013.01); *F05D 2220/32* (2013.01); *F05D 2240/80* (2013.01); *F05D 2300/17* (2013.01)

(58) Field of Classification Search
CPC ...... F01D 11/005; F01D 11/00; F01D 11/003; F02C 7/28; F16J 15/0887
See application file for complete search history.

(56) References Cited

U.S. PATENT DOCUMENTS

| | | | | |
|---|---|---|---|---|
| 4,121,843 | A | * | 10/1978 | Halling ................. F01D 11/005 277/647 |
| 4,199,151 | A | * | 4/1980 | Bartos ................... F01D 11/005 277/306 |
| 4,384,822 | A | * | 5/1983 | Schweikl ................ F01D 9/042 415/115 |
| 4,854,600 | A | | 8/1989 | Halling et al. |
| 5,433,370 | A | | 7/1995 | Halling |
| 5,562,408 | A | * | 10/1996 | Proctor ................... F01D 11/24 415/173.1 |

(Continued)

FOREIGN PATENT DOCUMENTS

| | | |
|---|---|---|
| EP | 2949874 A1 | 12/2015 |
| WO | WO9853228 A1 | 11/1998 |

(Continued)

OTHER PUBLICATIONS

Extended European Search Report for EP Application No. 17197433.0, dated Mar. 7, 2018, 9 Pages.

*Primary Examiner* — Nathaniel E Wiehe
*Assistant Examiner* — Andrew J Marien
(74) *Attorney, Agent, or Firm* — Kinney & Lange, P.A.

(57) ABSTRACT

A sealing assembly for a gas turbine engine includes a case, a support arm, a carrier, a vane, a seal, and a gasket. The support arm is connected to and extending radially inward from the case. The carrier is connected to an end of the support arm. A portion of the vane is disposed downstream of the carrier. A portion of the seal is disposed within the carrier. The gasket is disposed adjacent to and abutting the seal. The gasket is also positioned partially between the seal and the carrier and partially between the seal and the vane.

20 Claims, 4 Drawing Sheets

(56) References Cited

U.S. PATENT DOCUMENTS

| | | | |
|---|---|---|---|
| 5,716,052 A | 2/1998 | Swensen et al. | |
| 5,738,490 A * | 4/1998 | Pizzi | F01D 11/005 415/139 |
| 6,076,835 A * | 6/2000 | Ress | F01D 11/005 277/637 |
| 6,227,546 B1 | 5/2001 | Halling | |
| 6,237,921 B1 | 5/2001 | Liotta et al. | |
| 6,331,195 B1 | 12/2001 | Faust et al. | |
| 6,352,267 B1 | 3/2002 | Rode | |
| 6,402,466 B1 | 6/2002 | Burdgick et al. | |
| 6,626,440 B2 | 9/2003 | Halling | |
| 6,932,353 B2 | 8/2005 | Amos et al. | |
| 7,121,790 B2 | 10/2006 | Fokine et al. | |
| 8,016,297 B2 | 9/2011 | Heinemann et al. | |
| 8,034,142 B2 | 10/2011 | Sakakida et al. | |
| 8,162,327 B2 | 4/2012 | Halling | |
| 8,601,826 B2 | 12/2013 | Army et al. | |
| 8,651,497 B2 | 2/2014 | Tholen et al. | |
| 8,661,828 B2 | 3/2014 | Pieussergues et al. | |
| 8,814,173 B2 | 8/2014 | Motzkus et al. | |
| 8,961,108 B2 | 2/2015 | Bergman et al. | |
| 9,103,225 B2 | 8/2015 | Lutjen et al. | |
| 9,708,922 B1 * | 7/2017 | Davis | F01D 11/005 |
| 10,113,437 B2 * | 10/2018 | Davis | F01D 25/246 |
| 2004/0018085 A1 * | 1/2004 | Dhar | F01D 11/00 415/174.2 |
| 2004/0066005 A1 * | 4/2004 | Amos | F16J 15/008 277/391 |
| 2005/0118016 A1 * | 6/2005 | Fokine | F01D 11/005 415/175 |
| 2005/0123389 A1 * | 6/2005 | Morris | F01D 9/04 415/1 |
| 2006/0045746 A1 * | 3/2006 | Synnott | F01D 11/003 416/219 R |
| 2007/0235948 A1 * | 10/2007 | Halling | F16J 15/0887 277/626 |
| 2010/0072710 A1 | 3/2010 | Morgan et al. | |
| 2012/0319362 A1 | 12/2012 | Tholen et al. | |
| 2014/0250893 A1 * | 9/2014 | Chan | F02C 7/28 60/752 |
| 2015/0226132 A1 * | 8/2015 | Roy Thill | F16J 15/0887 415/183 |
| 2015/0330224 A1 | 11/2015 | Casaliggi et al. | |
| 2016/0003080 A1 * | 1/2016 | Mcgarrah | F01D 11/003 415/173.1 |

FOREIGN PATENT DOCUMENTS

| | | |
|---|---|---|
| WO | WO0012870 A1 | 3/2000 |
| WO | 0070192 A1 | 11/2000 |

* cited by examiner

W-SEAL SHIELD FOR INTERRUPTED CAVITY

BACKGROUND

The present disclosure relates generally to seal assemblies, and more particularly to seal assemblies for use in gas turbine engines.

In gas turbine engines, sheet metal seals and wave-form gaskets ("W-seals") are used to provide mechanical sealing between two or more components such as between a vane and a vane support. To ensure the W-seal stays in its cavity, significant amounts of radial contact length must be provided to the W-seal. Radial walls of adjacent vanes must extend beyond the contact point of the W-seal to ensure the seal convolute is always radially engaged, which adds weight to the engine and requires a rail of the vane to have a constant radius to ensure engagement with all contact points on the W-seal.

SUMMARY

A sealing assembly for a gas turbine engine includes a case, a support arm, a carrier, a vane, a seal, and a gasket. The support arm is connected to and extends radially inward from the case. The carrier is connected to an end of the support arm. A portion of the vane is disposed downstream of the carrier. A portion of the seal is disposed within the carrier. The gasket is disposed adjacent to and abutting the seal. The gasket is also positioned partially between the seal and the carrier and partially between the seal and the vane.

A sealing assembly for turbine section of a gas turbine engine includes a turbine case, a support arm, a carrier, an airfoil, a W-seal, and a J-shield gasket. The turbine case extends around a centerline of the gas turbine engine. The support arm is connected to and extends radially inward from the turbine case. The carrier is connected to an end of the support arm and includes a slot extending circumferentially about the centerline of the gas turbine engine. The airfoil includes a platform disposed on a radially outward end of the airfoil. The platform includes a rail disposed downstream of the carrier. A portion of the W-seal is disposed within the slot of the carrier. The W-seal includes a convolution and a straight sidewall. The J-shield gasket is disposed adjacent to and abutting the W-seal and adjacent to and abutting the rail. The J-shield gasket includes a first portion, a second portion, a first curved corner, and a second curved corner. The first portion is disposed radially outwards from the W-seal and positioned between an outer diameter of the W-seal and the carrier. The second portion is disposed axially downstream from the W-seal and positioned between the W-seal and the rail. The first curved corner is disposed between the first and second portions of the J-shield gasket. The second curved corner is disposed on an end of the second portion of the J-shield gasket opposite the first portion.

A sealing assembly includes a W-seal and a J-shield gasket. The W-seal includes a full-hoop configuration such that the W-seal extends around an entire circumference of the W-seal. The W-seal also includes a plurality of convolutions, a plurality of walls, a first sidewall, and a second sidewall. The plurality of walls extends between and is connected to the plurality of convolutions such that the plurality of convolutions and the plurality of walls are configured to form a serpentine shape. The first sidewall is disposed on a first end of the W-seal. The second sidewall is disposed on a second end of the W-seal opposite from the first sidewall. The J-shield gasket includes a full-hoop configuration such that the J-shield gasket extends around an entire circumference of the J-shield gasket. The J-shield gasket is disposed adjacent to and abutting the W-seal. The J-shield gasket further includes a first portion, a second portion, a first corner, and a second corner. The first portion is disposed radially outwards from and extending around the W-seal. The second portion is disposed perpendicular to the first portion and is adjacent to and abutting the second sidewall of the W-seal. The first corner is disposed between the first and second portions of the J-shield gasket. The first corner abuts a convolution located nearest the second end of the W-seal. The second corner is disposed on an end of the second portion of the J-shield gasket opposite the first portion. The second corner is positioned radially inward from the second sidewall of the W-seal.

DETAILED DESCRIPTION

Figure 1:
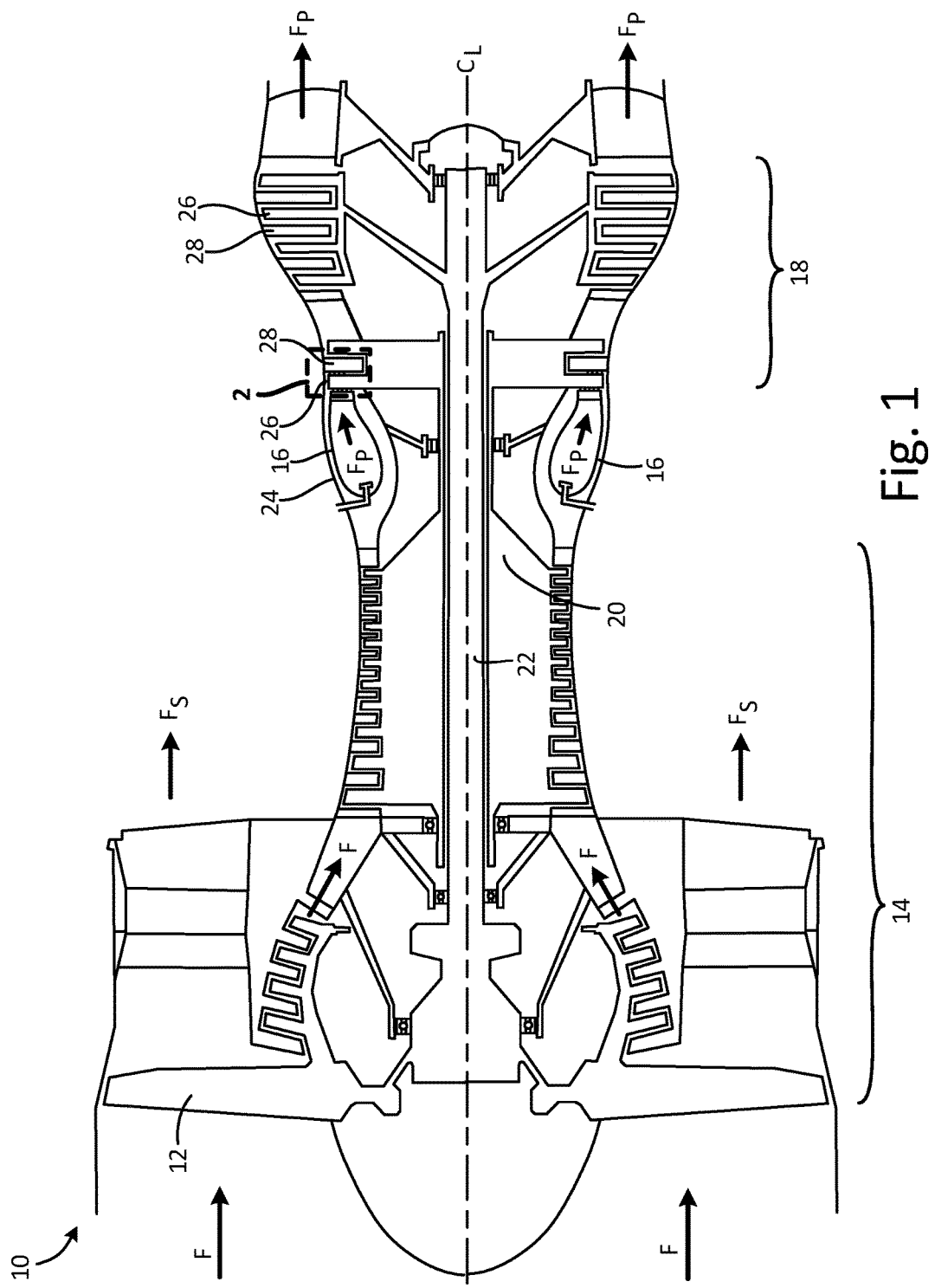
FIG. 1 is a schematic diagram of a gas turbine engine.

FIG. 1 is a schematic diagram of gas turbine engine 10. The view in FIG. 1 is a longitudinal sectional view along engine center line $C_L$. FIG. 1 shows gas turbine engine 10 including fan 12, compressor 14, combustor 16, turbine 18, high-pressure rotor 20, low-pressure rotor 22, and engine casing 24. Turbine 18 includes rotor blades 26 and stator vanes 28.

As illustrated in FIG. 1, fan 12 is positioned along engine center line $C_L$ at one end of gas turbine engine 10. Compressor 14 is adjacent fan 12 along engine center line $C_L$, followed by combustor 16. Turbine 18 is located adjacent combustor 16, opposite compressor 14. High-pressure rotor 20 and low-pressure rotor 22 are mounted for rotation about engine center line $C_L$. High-pressure rotor 20 connects a high-pressure section of turbine 18 to compressor 14. Low-pressure rotor 22 connects a low-pressure section of turbine 18 to fan 12. Rotor blades 26 and stator vanes 28 are arranged throughout turbine 18 in alternating rows. Rotor blades 26 connect to high-pressure rotor 20 and low-pressure rotor 22. Engine casing 24 surrounds gas turbine engine 10 providing structural support for compressor 14, combustor 16, and turbine 18, as well as containment for cooling air flow, as described below.

In operation, air flow F enters compressor 14 through fan 12. Air flow F is compressed by the rotation of compressor 14 driven by high-pressure rotor 20. The compressed air from compressor 14 is divided, with a portion going to combustor 16, and a portion employed for cooling components exposed to high-temperature combustion gases, such as a blade outer air seal ("BOAS") and stator vanes, as described below. Compressed air and fuel are mixed and ignited in combustor 16 to produce high-temperature, high-pressure combustion gases $F_p$. Combustion gases $F_p$ exit combustor 16 into turbine section 18. Stator vanes 28 properly align the flow of combustion gases $F_p$ for an efficient attack angle on subsequent rotor blades 26. The flow of combustion gases $F_p$ past rotor blades 26 drives rotation of both high-pressure rotor 20 and low-pressure rotor 22. High-pressure rotor 20 drives a high-pressure portion of compressor 14, as noted above, and low-pressure rotor 22 drives fan 12 to produce thrust $F_s$ from gas turbine engine 10. Although embodiments of the present invention are illustrated for a turbofan gas turbine engine for aviation use, it is understood that the present invention applies to other aviation gas turbine engines and to industrial gas turbine engines as well.

Figure 2:
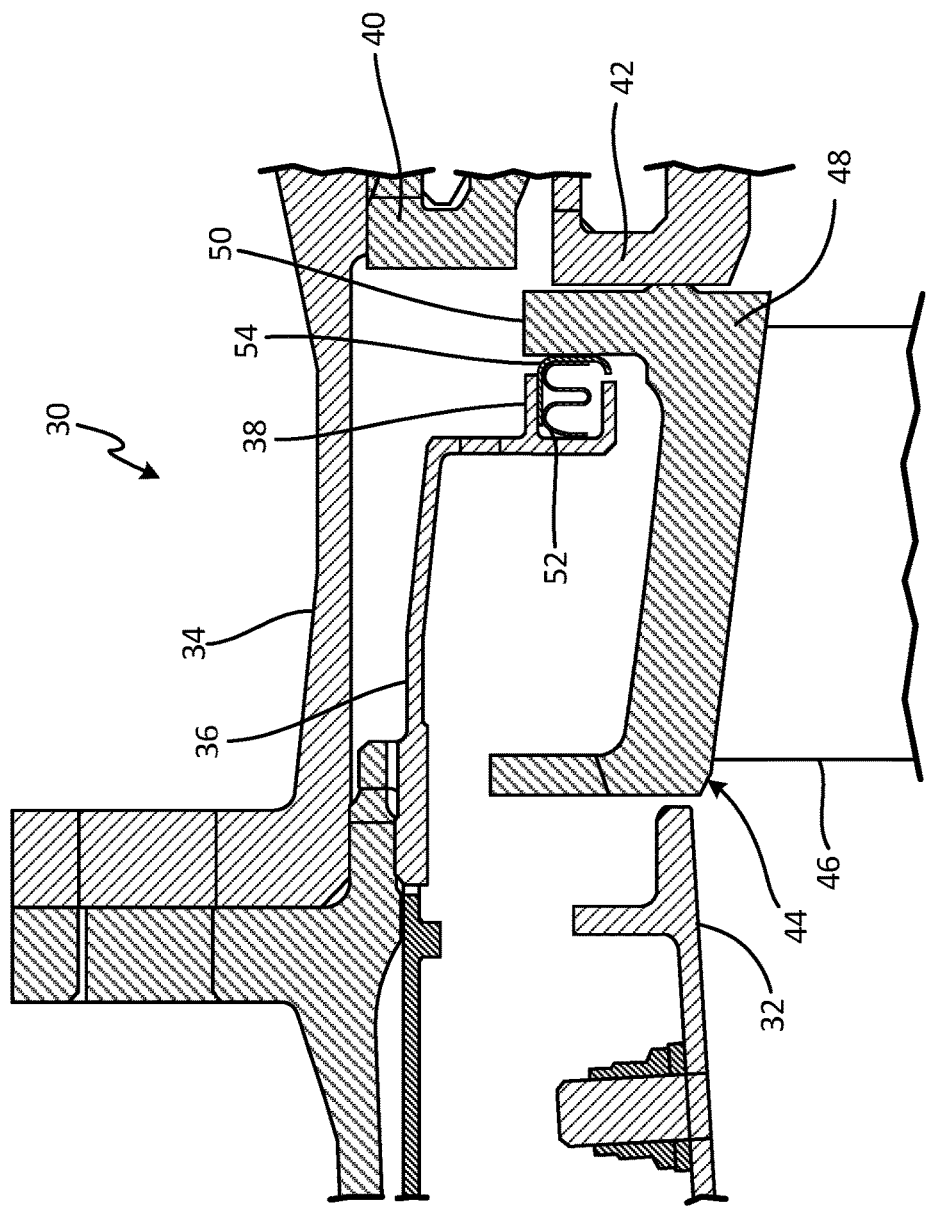
FIG. 2 is a cross-section view of a high pressure turbine section of the gas turbine engine.
Figure 3:
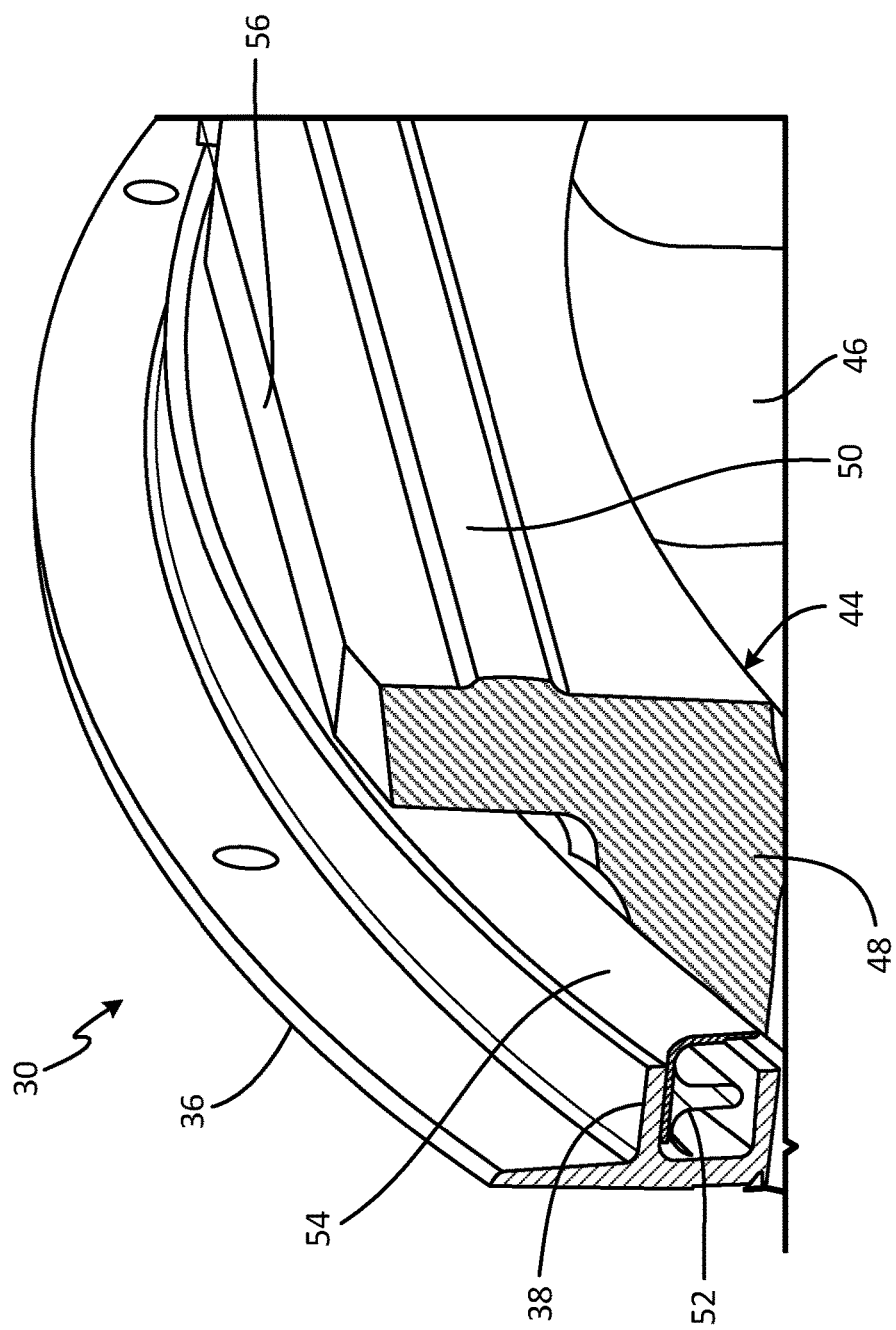
FIG. 3 is a partial perspective view of the high pressure turbine section of the gas turbine engine with a carrier, a W-seal and a J-shield gasket.

FIG. 2 is a cross-section view of high pressure turbine section 30 of gas turbine engine 10. FIG. 3 is a partial perspective view of high pressure turbine section 30 gas turbine engine 10. FIG. 2 and FIG. 3 will be discussed together High pressure turbine section 30 includes combustion liner 32, turbine case 34, support arm 36 with carrier 38, BOAS 40, BOAS support 42, vane 44 (which includes airfoil 46, platform 48, and rail 50), W-seal 52, and J-shield gasket 54. Rail 50 includes cut-out 56 (see FIG. 3).

Combustion liner 32 is a liner for combustor 16 (FIG. 1). Turbine case 34 is a case or housing of solid metallic material surrounding high pressure turbine section 30 (FIG. 1). Support arm 36 is a band of solid material extending circumferentially around center line $C_L$. Carrier 38 is a U-shaped band of solid material extending circumferentially around center line $C_L$. BOAS 40 is a blade outer air seal. BOAS support 42 is an element that provides support for BOAS 40. Vane 44 is a stator vane including airfoil 46, platform 48, and rail 50. In one non-limiting embodiment, vane 44 includes what is known as a vane doublet, which includes a set of two airfoils connected to the same platform. In other non-limiting embodiments, vane 44 can include a lesser or greater number of airfoils than two such as singlets, triplets, quadruplets, etc.

Airfoils 46 are solid structures with opposing curved pressure and suction surfaces. Platform 48 is a solid piece of material extending a partial circumference around center line $C_L$. Rail 50 is a tab of solid material extending in a generally radial direction from platform 48.

W-seal 52 is a single-piece conformal seal extending around center line $C_L$. W-seal 52 includes a full-hoop configuration such that W-seal 52 is a single piece extending around an entire circumference of W-seal 52. The configuration of W-seal 52 is discussed further with respect to FIG. 4.

J-shield gasket 54 is a wear liner extending around an entire circumference of J-shield 54 gasket around center line $C_L$, which is also known as a full-hoop configuration. J-shield gasket 54 includes sheet metal or a sheet of metal. In one non-limiting embodiment, J-shield gasket 54 is a rolled piece of cobalt alloy sheet metal with a welded seam. In another non-limiting embodiment, J-shield gasket 54 can include a coating such as an air plasma spray or a thermal spray coating, for example a high-velocity oxygen fuel spray coating. The coating can include a chromium based material. The configuration of J-shield gasket 54 is discussed further with respect to FIG. 4.

Cut-out 56 is a gap or space in platform 48 where a portion of rail 50 has been removed. Cut-out 56 includes a flat shaped cut-out along a radially outward edge of rail 50. In other non-limiting embodiments, cut-out 56 can include a jagged or curved shaped cut-out or scallop. Cut-out 56 provides the benefit of weight reduction by removing material from platform 48 that is no longer needed to restrain w-seal 52 from dislodging from carrier 38.

Combustion liner 32 is positioned upstream of vane 44. An edge of combustor liner 32 is within close proximity to an upstream edge of platform 48. Turbine case 34 extends around centerline $C_L$ of gas turbine engine 10 and contains support arm 36 with carrier 38, BOAS 40, BOAS support 42, vane 44, airfoil 46, platform 48, rail 50, W-seal 52, and J-shield gasket 54. Support arm 36 is connected to and extends radially inward from turbine case 34. Carrier 38 is connected to an end of support arm 36. BOAS 40 and BOAS support 42 are positioned axially downstream (to the right in FIGS. 2 and 3) of vane 44. Vane 44 is generally aligned with support arm 36 along a radial direction.

Airfoil 46 is disposed radially inward of and is connected to platform 48. Platform 48 is disposed on a radially outward end of airfoil 46. Rail 50 is formed as a part of platform 48 and extends radially outward from platform 48. Rail 50 is disposed downstream of carrier 38. A portion of rail 50 is disposed adjacent to and abutting J-shield gasket 54.

A portion of W-seal 52 is disposed within carrier 38 such that W-seal 52 is adjacent to and abutting carrier 38. Within carrier 38, W-seal 52 is positioned within carrier 38 such that W-seal 52 is able to rotate within carrier 38. In one non-limiting embodiment, W-seal 52 can be interference fit or slip fit into J-shield gasket 54.

J-shield gasket 54 is disposed adjacent to and abutting W-seal 52. J-shield gasket 54 is also disposed adjacent to and abutting rail 50. J-shield gasket 54 is slidably engaged with rail 50 of platform 48. J-shield gasket 54 partially encloses W-seal 52 in order to maintain constant radial engagement of the contact points between W-seal 52 and J-shield gasket 54. In one non-limiting embodiment, J-shield gasket 54 can be interference fit or slip fit into carrier 38.

W-seal 52 is integral to a pressure drop across vane 44 such that W-seal 52 acts as a pressure wall which serves to meter the flow of cooling air to BOAS 40. W-seal 52 separates the plenum between upstage vanes and combustor 16 and downstream blades and BOAS 40. A positive pressure differential exists across W-seal 52 which helps engage W-seal 52 and J-shield gasket 54. Air pressure on an upstream (to the left in FIGS. 2 and 3) side of W-seal 52 presses W-seal 52 outboard and aft such that W-seal 52 is energized and the outer walls of W-seal 52 are pressed outwards and against carrier 38 and J-shield gasket 54.

Due to the constraints and thermal growth of vane 44, W-seal 52 is subject to excessive relative motion at the interface between W-seal 52 and rail 50 of vane 44. Without the use of J-shield gasket 54, rail 50 must include a large radial height across the entire arc-length of vane 44 so as to contain W-seal 52 within carrier 38 and maintain a seal contact land throughout all transient mission time points. However, even with a radially tall rail 50, relative motion between W-seal 52 and vane 44 can cause degradation and mechanically driven failure of W-seal 52.

J-shield gasket 54 comes into contact with rail 50 of vane 44 so as to prevent wear caused by the relative motion between W-seal 52 and vane 44. Rail 50 pins or holds J-shield gasket 54 in carrier 38 to prevent J-shield gasket 54 from dislodging from carrier 38. J-shield gasket 54 pins or holds W-seal 52 in carrier 38 to prevent W-seal 52 from dislodging from carrier 38. J-shield gasket 54 also fully encloses W-seal 52 such that W-seal 52 is aero-shielded from secondary flow systems such as reflected jet-impingement.

Cut-out 56 in rail 50 is configured such that the circumferential ends of platform 48 form contact points with J-shield gasket 54. In one non-limiting embodiment, the circumferential ends of platform 48 can be locally extended in the radial direction to provide for additional interaction between vane 44 and support arm 36 during moments of high relative motion between vane 44 and J-shield gasket 54.

J-shield gasket 54 prevents wear between vane 44 and W-seal 52 and also prevents damage to W-seal 52 against flow-impingement from secondary flow recirculation effects throughout high pressure turbine section 30. The curved configuration of J-shield gasket 54 prevents binding of rail 50 and J-shield gasket 54 which allows relative radial motion between rail 50 and J-shield gasket 54. The J-shaped configuration of J-shield gasket 54 incorporates inner diameter and outer diameter lead-in features which ensure W-seal 52 is always radially engaged. Constant radial engagement is maintained between W-seal 52 and J-shield gasket 54 allowing for the adjacent rail 50 of platforms 48 to be irregularly shaped and/or incorporate cut-outs 56 and/or scallops which provide the benefit of weight reduction. J-shield gasket 54 additionally helps to entrain W-seal 52 in order to reduce the risk of wear-out at the contact points of W-seal 52.

Figure 4:
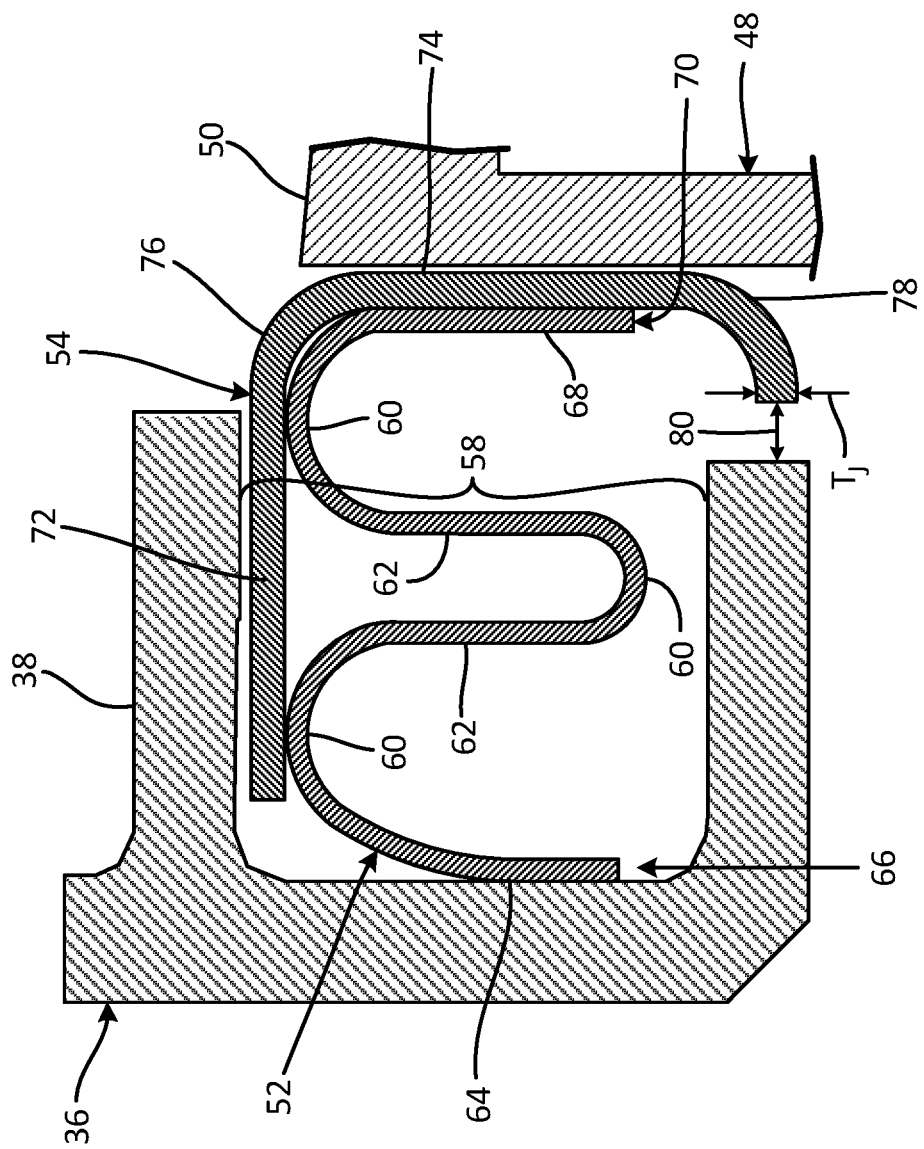
FIG. 4 is a cross-section view of the carrier, the W-seal and the J-shield gasket.

FIG. 4 is a cross-sectional view of carrier 38, W-seal 52, and J-shield gasket 54. FIG. 4 shows support arm 36, carrier 38, rail 50 of platform 48, W-seal 52, and J-shield gasket 54. Carrier 38 includes slot 58. W-seal 52 includes convolutions 60, walls 62, first sidewall 64, first end 66, second sidewall 68, and second end 70. J-shield gasket 54 includes first portion 72, second portion 74, first corner 76, and second corner 78. FIG. 4 also includes gap 80 between carrier 38 and J-shield gasket 54.

As shown in FIG. 4, J-shield gasket 54 has thickness $T_J$. In one non-limiting embodiment, thickness $T_J$ of J-shield gasket 54 is 0.010 inches (0.254 millimeters) to 0.040 inches (1.016 millimeters). In another non-limiting embodiment, a ratio of the thickness of W-seal 52 to thickness $T_J$ of J-shield gasket 54 is 1:1 up to 1:4.

Slot 58 in carrier 38 is a U-shaped opening or slot in carrier 38 extending circumferentially about centerline $C_L$ of gas turbine engine 10. Convolutions 60 are bends or corners in W-seal 52. Walls 62 are straight portions of W-seal 52. First sidewall 64 is a sidewall of W-seal 52 disposed on first end 66 of W-seal 52. In FIG. 4, first end 66 is positioned on an upstream end of W-seal 52. Second sidewall 68 is a sidewall of W-seal 52 disposed on second end 70 of W-seal 52. In FIG. 4, second end 70 is positioned on a downstream end of W-seal 52. First portion 72 and second portion 74 are straight walls or pieces of J-shield gasket 54. In another non-limiting embodiment, J-shield gasket 54 can include another portion which extends between the radially inner side of W-seal 52 and the bottom arm of carrier 38. First corner 76 and second corner 78 are bends or curves in J-shield gasket 54. Gap 80 is a space between carrier 38 and J-shield gasket 54. In this example, gap 80 extends in an axial direction between carrier 38 and J-shield gasket 54.

W-seal 52 is disposed within slot 58 of carrier 38. As shown in FIG. 4, W-seal 52 with convolutions 60 and walls 62 is a compliant seal such that W-seal has a spring force biased in outward or axial (in FIG. 4 shown as right and left) directions. Walls 62 of W-seal 52 extend between and are connected to convolutions 60, such that convolutions 60 and walls 62 are configured to form a serpentine shape. Walls 62 are disposed between each axially successive convolution 60. First sidewall 64 is disposed on first end 66 of W-seal 52. Second sidewall 68 is disposed on second end 70 of W-seal 52 opposite from first sidewall 64.

First portion 72 of J-shield gasket 54 is disposed radially outwards from and extending around W-seal 52. Second portion 74 of J-shield gasket 54 is disposed perpendicular to first portion 72 and is adjacent to and abutting second sidewall 68 of W-seal 52. First corner 76 of J-shield gasket 54 is disposed between first portion 72 and second portion 74 of J-shield gasket 54. First corner 76 abuts convolution 60 located nearest second end 70 of w-seal 52. Second corner 78 of J-shield gasket 54 is disposed on an end of second portion 74 opposite first portion 72. Second corner 78 is positioned radially inward from second sidewall 68 of W-seal 52.

Gap 80 between carrier 38 and J-shield gasket 54 is positioned along a radially inward side of carrier 38 and second corner 78 of J-shield gasket 54. W-seal 52 with convolutions 60 is configured to maintain a pre-load force in W-seal 52 during assembly and operation of high pressure turbine section 30.

First corner 76 and second corner 78 of J-shield gasket 54 provide lead-in features allowing J-shield gasket 54 to slide against platform 48 of vane 44. The curved configuration of first corner 76 and second corner 78 are able to slide along platform 48 of vane 44 due to the curved configuration of first corner 76 and second corner 78. The curved configuration of first corner 76 and second corner 78 does not include any sharp or right angles which helps to prevent J-shield gasket 54 from binding against platform 48 during relative motion between J-shield gasket 54 and platform 48. First corner 76 and second corner 78 of J-shield gasket 54 also provide the benefit of allowing platform 48 to slide against J-shield gasket 54 during assembly of high pressure turbine section 30 without platform 48 binding against J-shield gasket 54.

J-shield gasket 54 prevents wear between vane 44 and W-seal 52 and damage to W-seal 52 from secondary flow recirculation effects. The curved configuration of J-shield gasket 54 prevents binding allows relative radial motion between platform 48 and J-shield gasket 54. Constant radial engagement is maintained between W-seal 52 and J-shield gasket 54 allowing for the adjacent rail 50 of platforms 48 to be irregularly shaped and/or incorporate cut-outs 56 and/or scallops providing the benefit of weight reduction. J-shield gasket 54 additionally helps to entrain W-seal 52 in order to reduce the risk of wear-out at the contact points of W-seal 52.

Gap 80 allows for relative motion (e.g., axial and radial) between J-shield gasket 54 and carrier 38. In one non-limiting embodiment, a size of gap 80 can be 0.000 inches to 0.010 inches (1.016 millimeters). As discussed above, gap 80 also allows air pressure on an upstream (to the left in FIGS. 2, 3, and 4) side of W-seal 52 to press W-seal 52 outboard and aft such that W-seal 52 is energized and first sidewall is pressed against carrier 38 and second sidewall 68 is pressed against J-shield gasket 54. Gap 80 also prevents damage to J-shield gasket 54 and/or to carrier 38 by providing for relative motion (e.g., axial and radial) between J-shield gasket 54 and carrier 38.

Discussion of Possible Embodiments

The following are non-exclusive descriptions of possible embodiments of the present invention.

A sealing assembly for a gas turbine engine includes a case, a support arm, a carrier, a vane, a seal, and/or a gasket. The support arm is connected to and extends radially inward from the case. The carrier is connected to an end of the support arm. A portion of the vane is disposed downstream of the carrier. A portion of the seal is disposed within the carrier. The gasket is disposed adjacent to and abutting the seal. The gasket is also positioned partially between the seal and the carrier and/or partially between the seal and the vane.

The assembly of the preceding paragraph can optionally include, additionally and/or alternatively, any one or more of the following features, configurations and/or additional components.

The gasket includes first and second portions, a first curved corner that is disposed between the first and second portions of the gasket, and/or a second curved corner that is disposed on an end of the second portion of the gasket opposite the first portion.

The vane can comprise an airfoil and a platform disposed on a radially outward end of the airfoil, the platform includes a rail, wherein a portion of the rail is disposed adjacent to and/or abutting the gasket.

The first portion of the gasket is positioned between the seal and the carrier, and the second portion of the gasket is positioned between the seal and the rail of the platform.

The rail includes a cut-out along a portion of the rail.

The gasket is slidably engaged with the rail of the platform.

The gasket can comprise a full-hoop configuration.

A material of the gasket can comprise cobalt alloy.

The gasket can comprise sheet metal.

A thickness of the gasket is 0.010 inches (0.254 millimeters) to 0.040 inches (1.016 millimeters).

The seal can be a W-seal.

A sealing assembly for turbine section of a gas turbine engine includes a turbine case, a support arm, a carrier, an airfoil, a W-seal, and/or a J-shield gasket. The turbine case extends around a centerline of the gas turbine engine. The support arm is connected to and extends radially inward from the turbine case. The carrier is connected to an end of the support arm and includes a slot extending circumferentially about the centerline of the gas turbine engine. The airfoil includes a platform disposed on a radially outward end of the airfoil. The platform includes a rail disposed downstream of the carrier. The W-seal includes a convolution, a straight sidewall, and/or a portion of the w-seal disposed within the slot of the carrier. The J-shield gasket is disposed adjacent to and abutting the W-seal and adjacent to and abutting the rail. The J-shield gasket includes a first portion, a second portion, a first curved corner, and/or a second curved corner. The first portion is disposed radially outwards from the W-seal and/or positioned between an outer diameter of the W-seal and the carrier. The second portion is disposed axially downstream from the W-seal and/or positioned between the W-seal and the rail. The first curved corner is disposed between the first and second portions of the J-shield gasket. The second curved corner is disposed on an end of the second portion of the J-shield gasket opposite the first portion.

The assembly of the preceding paragraph can optionally include, additionally and/or alternatively, any one or more of the following features, configurations and/or additional components.

The W-seal and the J-shield gasket can comprise a full-hoop configuration.

A material of the J-shield gasket is formed of a cobalt alloy.

The J-shield gasket can comprise sheet metal.

A thickness of the J-shield gasket is 0.010 inches (0.254 millimeters) to 0.040 inches (1.016 millimeters).

A sealing assembly includes a W-seal and a J-shield gasket. The W-seal includes a full-hoop configuration such that the W-seal includes a single piece of material extending around an entire circumference of the W-seal. The W-seal also includes a plurality of convolutions, a plurality of walls, a first sidewall, and/or a second sidewall. The plurality of walls extends between and are connected to the plurality of convolutions such that the plurality of convolutions and the plurality of walls are configured to form a serpentine shape. The first sidewall is disposed on a first end of the W-seal. The second sidewall is disposed on a second end of the W-seal opposite from the first sidewall. The J-shield gasket includes a full-hoop configuration such that the J-shield gasket includes a single piece of material extending around an entire circumference of the J-shield gasket. The J-shield gasket is disposed adjacent to and/or abutting the W-seal. The J-shield gasket further includes a first portion, a second portion, a first corner, and/or a second corner. The first portion is disposed radially outwards from and/or extending around the W-seal. The second portion is disposed perpendicular to the first portion and is adjacent to and/or abutting the second sidewall of the W-seal. The first corner is disposed between the first and second portions of the J-shield gasket. The first corner abuts a convolution located nearest the second end of the w-seal. The second corner is disposed on an end of the second portion of the J-shield gasket opposite the first portion. The second corner is positioned radially inward from the second sidewall of the w-seal.

The assembly of the preceding paragraph can optionally include, additionally and/or alternatively, any one or more of the following features, configurations and/or additional components.

A material of the J-shield gasket is formed of a cobalt alloy.

The J-shield gasket can comprise sheet metal.

A thickness of the J-shield gasket is 0.010 inches (0.254 millimeters) to 0.040 inches (1.016 millimeters).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A sealing assembly for a gas turbine engine, the sealing assembly comprising:
 a case;
 a support arm connected to and extending radially inward from the case;
 a carrier connected to an end of the support arm;
 a vane having a portion disposed downstream of the carrier;
 a seal having a portion disposed within the carrier, wherein a portion of the seal is adjacent to and abutting a portion of the carrier; and
 a gasket disposed adjacent to and abutting the seal, the gasket positioned partially between the seal and the carrier and partially between the seal and the vane, wherein the gasket comprises:
  a first straight portion and a second straight portion;
  wherein the first straight portion of the gasket is positioned radially outward from and in contact with the seal;

a first curved corner disposed between the first straight portion and the second straight portion of the gasket; and a second curved corner disposed on an end of the second straight portion of the gasket opposite the first straight portion, wherein the carrier and the gasket form a gap extending axially between, a radially inward side of the carrier and the second curved corner of the gasket.

2. The sealing assembly of claim 1, wherein the vane comprises an airfoil and a platform disposed on a radially outward end of the airfoil, the platform including a rail, wherein a portion of the rail is disposed adjacent to and abutting the gasket, wherein the rail holds the gasket in the carrier to prevent the gasket from dislodging from the carrier.

3. The sealing assembly of claim 2, wherein the first straight portion of the gasket is positioned between the seal and the carrier, and the second straight portion of the gasket is positioned between the seal and the rail of the platform.

4. The sealing assembly of claim 2, wherein the rail includes a cut-out along a portion of the rail.

5. The sealing assembly of claim 2, wherein the gasket is slidably engaged with the rail of the platform.

6. The sealing assembly of claim 1, wherein the gasket comprises a full-hoop configuration.

7. The sealing assembly of claim 1, wherein the gasket is formed of a cobalt alloy.

8. The sealing assembly of claim 1, wherein the gasket comprises sheet metal.

9. The sealing assembly of claim 1, wherein a thickness of the gasket is 0.010 inches (0.254 millimeters) to 0.040 inches (1.016 millimeters).

10. The sealing assembly of claim 1, wherein the seal is a W-seal.

11. A sealing assembly for turbine section of a gas turbine engine, the sealing assembly comprising:
a turbine case extending around a centerline of the gas turbine engine;
a support arm connected to and extending radially inward from the turbine case;
a carrier connected to an end of the support arm, the carrier with a slot extending circumferentially about the centerline of the gas turbine engine;
an airfoil with a platform disposed on a radially outward end of the airfoil, the platform including a rail disposed downstream of the carrier;
a W-seal comprising a convolution, a straight sidewall, and a portion of the W-seal disposed within the slot of the carrier, wherein the straight sidewall is adjacent to and abutting a portion of the carrier; and
a J-shield gasket disposed adjacent to and abutting the W-seal and adjacent to and abutting the rail, wherein the rail holds the J-shield gasket in the carrier to prevent the J-shield gasket from dislodging from the carrier, wherein the J-shield gasket comprises:
a first straight portion disposed radially outwards from the W-seal and positioned between an outer diameter of the W-seal and the carrier;
a second straight portion disposed axially downstream from the W-seal and positioned between the W-seal and the rail;

a first curved corner disposed between the first and second straight of the J-shield gasket; and
a second curved corner disposed on an end of the second straight portion of the J-shield gasket opposite the first straight portion, wherein the carrier and the gasket form a gap extending axially between a radially inward side of the carrier and the second curved corner of the gasket.

12. The sealing assembly of claim 1, wherein a size of the gap is between 0.000 inches and 0.010 inches (1.016 millimeters).

13. The sealing assembly of claim 11, wherein the W-seal and the J-shield gasket comprise a full-hoop configuration.

14. The sealing assembly of claim 11, wherein a material of the J-shield gasket comprises cobalt alloy.

15. The sealing assembly of claim 11, wherein the J-shield gasket comprises sheet metal.

16. The sealing assembly of claim 11, wherein a thickness of the J-shield gasket is 0.010 inches (0.254 millimeters) to 0.040 inches (1.016 millimeters).

17. A sealing assembly comprising:
a W-seal with a full-hoop configuration extending around an entire circumference of the W-seal, wherein the W-seal comprises:
a plurality of convolutions;
a plurality of walls extending between and connected to the plurality of convolutions such that the plurality of convolutions and the plurality of walls are configured to form a serpentine shape;
a first sidewall disposed on a first end of the W-seal;
a second sidewall disposed on a second end of the W-seal opposite from the first sidewall; and
a J-shield gasket with a full-hoop configuration extending around an entire circumference of the J-shield gasket, the J-shield gasket disposed adjacent to and abutting the W-seal, wherein the J-shield gasket comprises:
a first straight portion disposed radially outwards from and extending around the W-seal, wherein the first straight portion of the j-shield gasket is positioned radially outward from and in contact with the plurality of convolutions of the seal;
a second straight portion disposed perpendicular to the first straight portion, the second straight portion adjacent to and abutting the second sidewall of the W-seal;
a first corner disposed between the first and second straight of the J-shield gasket, wherein the first corner abuts a convolution located nearest the second end of the w-seal; and
a second corner disposed on an end of the second straight portion of the J-shield gasket opposite the first straight portion, wherein the second corner is positioned radially inward from the second sidewall of the w-seal.

18. The sealing assembly of claim 17, wherein the J-shield gasket is formed of cobalt alloy.

19. The sealing assembly of claim 17, wherein the J-shield gasket comprises sheet metal.

20. The sealing assembly of claim 17, wherein a thickness of the J-shield gasket is 0.010 inches (0.254 millimeters) to 0.040 inches (1.016 millimeters).

* * * * *